United States Patent
Chen et al.

(10) Patent No.: US 9,559,828 B2
(45) Date of Patent: *Jan. 31, 2017

(54) MULTIPLE CQI FEEDBACK FOR CELLULAR NETWORKS

(71) Applicant: TEXAS INSTRUMENTS INCORPORATED, Dallas, TX (US)

(72) Inventors: Runhua Chen, Plano, TX (US); Eko N. Onggosanusi, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 120 days.

This patent is subject to a terminal disclaimer.

(21) Appl. No.: 14/262,032

(22) Filed: Apr. 25, 2014

(65) Prior Publication Data

US 2014/0233498 A1 Aug. 21, 2014

Related U.S. Application Data

(63) Continuation of application No. 12/819,182, filed on Jun. 19, 2010, now Pat. No. 8,711,716.

(Continued)

(51) Int. Cl.
*H04L 5/00* (2006.01)
*H04B 7/04* (2006.01)
(Continued)

(52) U.S. Cl.
CPC .............. *H04L 5/0057* (2013.01); *H04B 7/024* (2013.01); *H04B 7/0417* (2013.01);
(Continued)

(58) Field of Classification Search
CPC .... H04L 5/0057; H04L 5/0051; H04L 1/0025; H04B 7/0417; H04B 7/0456; H04B 7/0452; H04B 7/024; H04B 7/0632; H04B 7/022; H04B 7/0634; H04B 7/063; H04B 7/0639

See application file for complete search history.

(56) References Cited

U.S. PATENT DOCUMENTS 8,045,508 B2 * 10/2011 Lee ................... H04B 7/063
370/328
8,159,978 B2   4/2012 Chun et al.
(Continued)

OTHER PUBLICATIONS

3GPP, "3rd Generation Partnership Project; Technical Specification Group Radio Access Network; Evolved Universal Terrestrial Radio Access (E-UTRA); Physical Channels and Modulation", 3GPP TS 36.211, Release 9, V9.1.0, Mar. 2010, Valbonne, France, pp. 1-85.

(Continued)

*Primary Examiner* — Christopher Grey
(74) *Attorney, Agent, or Firm* — Ronald O. Neerings; Charles A. Brill; Frank D. Cimino

(57) ABSTRACT

Single user and multiuser MIMO transmission in a cellular network may be performed by a base station (eNB) transmitting either one or two transmission layers. A user equipment (UE) receives a reference symbol from the base station. The UE processes the reference symbol with one or more of a plurality of preceding matrices to form a plurality of channel quality indices (CQI). The UE provides feedback to the eNB comprising one or more feedback CQI selected from the plurality of CQI and one or more preceding matrix indicators (PMI) identifying the one or more preceding matrices used to form each of the one or more feedback CQIs, wherein at least two PMI are included in the feedback.

25 Claims, 4 Drawing Sheets

Related U.S. Application Data

(60) Provisional application No. 61/218,688, filed on Jun. 19, 2009.

(51) Int. Cl.
  *H04L 1/00* (2006.01)
  *H04B 7/02* (2006.01)
  *H04B 7/06* (2006.01)

(52) U.S. Cl.
  CPC ......... *H04B 7/0452* (2013.01); *H04B 7/0456* (2013.01); *H04L 1/0025* (2013.01); *H04L 5/0051* (2013.01); *H04B 7/022* (2013.01); *H04B 7/063* (2013.01); *H04B 7/0632* (2013.01); *H04B 7/0634* (2013.01); *H04B 7/0639* (2013.01)

(56) References Cited

U.S. PATENT DOCUMENTS

| | | | |
|---|---|---|---|
| 8,400,950 B2 | 3/2013 | Ko et al. | |
| 8,432,819 B2 | 4/2013 | Chun et al. | |
| 8,711,716 B2* | 4/2014 | Chen | H04B 7/024 370/252 |
| 2008/0225960 A1* | 9/2008 | Kotecha | H04B 7/0413 375/259 |
| 2008/0253318 A1 | 10/2008 | Malladi et al. | |
| 2009/0103482 A1 | 4/2009 | Imamura et al. | |
| 2010/0002598 A1* | 1/2010 | Pan | H04B 7/063 370/252 |
| 2010/0098012 A1 | 4/2010 | Bala et al. | |
| 2010/0239036 A1* | 9/2010 | Koo | H04B 7/024 375/260 |
| 2010/0322176 A1* | 12/2010 | Chen | H04B 7/024 370/329 |
| 2011/0032839 A1* | 2/2011 | Chen | H04B 7/024 370/252 |
| 2013/0223549 A1* | 8/2013 | Tong | H04B 7/0478 375/260 |

OTHER PUBLICATIONS

3GPP, "3rd Generation Partnership Project; Technical Specification Group Radio Access Network; Evolved Universal Terrestrial Radio Access (E-UTRA); Physical layer procedures", 3GPP TS 36.213, Release 8, V8.5.0, Dec. 2008, Valbonne, France, pp. 1-74.

* cited by examiner

MULTIPLE CQI FEEDBACK FOR CELLULAR NETWORKS

CLAIM TO PRIORITY UNDER 35 U.S.C. 119

This present application is a Continuation of application Ser. No. 12/819,182 filed Jun. 19, 2010, which claims priority to an incorporates by reference U.S. provisional application No. 61/218,688 filed on Jun. 19, 2009, entitled "CQI Feedback for Downlink Multiuser MIMO (MU-MIMO) Systems."

FIELD OF THE INVENTION

This invention generally relates to wireless cellular communication, and in particular to multi-input multi-output transmission in orthogonal and single carrier frequency division multiple access (OFDMA) (SC-FDMA) systems.

BACKGROUND OF THE INVENTION

Wireless cellular communication networks incorporate a number of mobile UEs and a number of NodeBs. A NodeB is generally a fixed station, and may also be called a base transceiver system (BTS), an access point (AP), a base station (BS), or some other equivalent terminology. As improvements of networks are made, the NodeB functionality evolves, so a NodeB is sometimes also referred to as an evolved NodeB (eNB). In general, NodeB hardware, when deployed, is fixed and stationary, while the UE hardware may be portable.

User equipment (UE), also commonly referred to as a terminal or a mobile station, may be a fixed or mobile device and may be a wireless device, a cellular phone, a personal digital assistant (PDA), a wireless modem card, and so on. Uplink communication (UL) refers to a communication from the UE to the NodeB, whereas downlink (DL) refers to communication from the NodeB to the UE. Each NodeB contains radio frequency transmitter(s) and the receiver(s) used to communicate directly with the UE, which may move freely around it. Similarly, each UE contains radio frequency transmitter(s) and the receiver(s) used to communicate directly with the NodeB. In cellular networks, the UE cannot communicate directly with each other but have to communicate with the NodeB.

Long Term Evolution (LTE) wireless networks, also known as Evolved Universal Terrestrial Radio Access (E-UTRA), are being standardized by the 3GPP working groups (WG). OFDMA (orthogonal frequency division multiple access) and SC-FDMA (single carrier FDMA) access schemes were chosen for the down-link (DL) and up-link (UL) of E-UTRA, respectively. User equipment are time and frequency multiplexed on a physical uplink shared channel (PUSCH), and a fine time and frequency synchronization between UE's guarantees optimal intra-cell orthogonality. In case the UE is not UL synchronized, it uses a non-synchronized Physical Random Access Channel (PRACH), and the Base Station provides back some allocated UL resource and timing advance information to allow the UE to transmit on the PUSCH. The general operations of the physical channels are described in the EUTRA specifications, for example: "$3^{rd}$ Generation Partnership Project; Technical Specification Group Radio Access Network; Evolved Universal Terrestrial Radio Access (E-UTRA); Physical Channels and Modulation (TS 36.211 Release 8, or later)."

Several types of physical channels are defined for the LTE downlink. One common characteristic of physical channels is that they all convey information from higher layers in the LTE stack. This is in contrast to physical signals, which convey information that is used exclusively within the physical (PHY) layer. Currently, the LTE DL physical channels are as follows: Physical Downlink Shared Channel (PDSCH), Physical Broadcast Channel (PBCH), Physical Multicast Channel (PMCH), Physical Control Format Indicator Channel (PCFICH), Physical Downlink Control Channel (PDCCH), and Physical Hybrid ARQ Indicator Channel (PHICH).

A reference signal (RS) is a pre-defined signal, pre-known to both transmitter and receiver. The RS can generally be thought of as deterministic from the perspective of both transmitter and receiver. The RS is typically transmitted in order for the receiver to estimate the signal propagation medium. This process is also known as "channel estimation." Thus, an RS can be transmitted to facilitate channel estimation. Upon deriving channel estimates, these estimates are used for demodulation of transmitted information. In downlink transmission, two types of reference signals are available. The first type of reference signal is un-precoded and is transmitted over the entire system bandwidth of a cell, and is generally referred to as cell-specific reference signal (CRS). Another type of reference signal is modulated by the same precoder as applied on the data channel, and therefore enables a UE to estimate the effective precoded MIMO channel characteristics. This type of RS is sometimes referred to as De-Modulation RS or DMRS. DMRS is transmitted only when a UE is being scheduled, and is therefore only transmitted over the frequency resource assignment of data transmission. Note that DMRS can also be applied in uplink transmission (PUSCH), in case UE transmitter is equipped with multiple antennas. Note that RS can also be transmitted for other purposes, such as channel sounding (SRS), synchronization, or any other purpose. Also note that Reference Signal (RS) can be sometimes called the pilot signal, or the training signal, or any other equivalent term.

The LTE PHY can optionally exploit multiple transceivers and antenna at both the base station and UE in order to enhance link robustness and increase data rates for the LTE downlink. Spatial diversity can be used to provide diversity against fading. In particular, maximal ratio combining (MRC) is used to enhance link reliability in challenging propagating conditions when signal strength is low and multipath conditions are challenging. Transmit diversity can be used to improve signal quality by transmitting the same data from multiple antennas to the receiver. Spatial multiplexing can be used to increase system capacity by carrying multiple data streams simultaneously from multiple antennas on the same frequency. Spatial multiplexing may be performed with one of the following cyclic delay diversity (CDD) precoding methods: zero-delay, small-delay, or large-delay CDD. Spatial multiplexing may also be referred to as MIMO (multiple input multiple output).

With MRC, a signal is received via two (or more) separate antenna/transceiver pairs. The antennas are physically separated, and therefore have distinct channel impulse responses. Channel compensation is applied to each received signal within the baseband processor before being linearly combined to create a single composite received signal. When combined in this manner, the received signals add coherently within the baseband processor. However, the thermal noise from each transceiver is uncorrelated, resulting in improved signal to noise ratio (SNR). MRC enhances link reliability, but it does not increase the nominal system data rate since data is transmitted by a single antenna and is processed at the receiver via two or more receivers. MRC is therefore a form of receiver diversity rather than more conventional antenna diversity.

MIMO, on the other hand, does increase system data rates. This is achieved by using multiple antennas on both the transmitting and receiving ends. In order to successfully receive a MIMO transmission, the receiver must determine the channel impulse response from each transmitting antenna. In LTE, channel impulse responses are determined by sequentially transmitting known reference signals from each transmitting antenna. While one transmitter antenna is sending the reference signal, the other antenna is idle. Once the channel impulse responses are known, data can be transmitted from both antennas simultaneously. The linear combination of the two data streams at the two receiver antennas results in a set of two equations and two unknowns, which is resolvable into the two original data streams.

Physical channels are mapped to specific transport channels. Transport channels are service access points (SAPs) for higher layers. Each physical channel has defined algorithms for bit scrambling, modulation, layer mapping, preceding, and resource assignment. Layer mapping and preceding are related to MIMO applications. Basically, a layer corresponds to a spatial multiplexing channel. Channel rank can vary from one up to the minimum of number of transmit and receive antennas. For example, given a 4×2 system, i.e., a system having four transmit antennas and two receive antennas, the maximum channel rank is two. The channel rank associated with a particular connection varies in time and frequency as the fast fading alters the channel coefficients. Moreover, the channel rank determines how many layers, also referred to as the transmission rank, can be successfully transmitted simultaneously. For example, if the channel rank is one at the instant of the transmission of two layers, there is a strong likelihood that the two signals corresponding to the two layers will interfere so much that both of the layers are erroneously detected at the receiver. In conjunction with precoding, adapting the transmission to the channel rank involves striving to use as many layers as the channel rank. Layer mapping specifies exactly how the extra transmitter antennas are employed. For non-codebook based precoding, the precoding applied for the demodulation reference signal (DMRS) is the same as the one applied for the PUSCH (for uplink) and PDSCH (for downlink). Multiplexing of the demodulation reference signals can be time-division multiplexing, frequency division multiplexing, code division multiplexing or a combination of them.

Precoding is used in conjunction with spatial multiplexing. The basic principle involved in precoding is to mix and distribute the modulation symbols over the antennas while potentially also taking the current channel conditions into account. Precoding can be implemented by, for example, multiplying the information carrying symbol vector containing modulation symbols by a matrix which is selected to match the channel based on a certain selection criterion. Some examples of selection criterion include average throughput and maximum signal-to-interference-noise ratio (SINR). Sequences of symbol vectors thus form a set of parallel symbol streams and each such symbol stream is referred to as a "layer". Thus, depending on the choice of precoder in a particular implementation, a layer may directly correspond to a certain physical antenna or a layer may, via the precoder mapping, be distributed onto several physical antennas.

In LTE Rel-8, single layer beamforming on antenna port 5 is already supported. Single-layer beamforming is based on non-codebook precoding and relies on a dedicated demodulation reference symbol (DMRS) for data demodulation. DMRS symbols are precoded with the same precoding matrices as the PDSCH data symbols and therefore enable UE to estimate the "effective" channel after precoding. Rank-1 transmission is enforced. A UE is restricted to receive a single transport block (codeword) which is mapped to one layer (data stream) in DL transmission. From the UE's perspective, the effective 1-layer channel appears as if data is transmitted from a single virtual antenna. DMRS corresponding to this layer is defined as antenna port 5 in LTE Rel-8 to enable channel estimation.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

A UE that can best estimate channel conditions and then signal the best coding to use will get the best performance out of the channel. Although the use of a codebook for precoding limits the best fit to the channel, it significantly simplifies the channel estimation process by the UE and the amount of uplink signaling needed to convey the desired precoding. Multi-user MIMO (MU-MIMO) and coordinated multi-point (CoMP) transmission complicate the process of providing channel feedback. Various embodiments of an improved feedback protocol for use with MU-MIMO or with CoMP applications will be described in this disclosure.

For best operation, a transmitter must have knowledge of the channel, which is provided by the UE on the uplink control channel. This process is generally referred to as channel station information (CSI) feedback. This knowledge may include a channel quality index (CQI), a precoding matrix Indicator (PMI), and a rank indication (RI). CSI feedback (RI/PMI/CQI) are recommended MIMO transmission properties derived at the UE based on the channel estimation. For example, RI is the recommended number of transmission layers (rank). PMI reflects the recommended precoding matrices within the recommended rank (RI). CaI is the observed channel quality indicator (e.g. recommended modulate and coding scheme) assuming that the RI/PMI feedback are used for MIMO precoding. The PMI feedback uses a codebook approach to provide an index into a predetermined set of precoding matrices. For 2×2 MIMO, there may be three different codewords for rank-2 precoding, and four different codewords for rank-1 precoding; for 4×2 there may be 16 codewords for rank-1 and rank-2, respectively. Since the channel is continually changing, sub-band CQI and PMI information may be provided for multiple points across the channel bandwidth, at regular time intervals, up to several hundred times a second. The RI is typically provided at a much lower rate for the whole channel.

The general procedure for determining and specifying CQI and PMI is defined in the EUTRA specifications, for example: "$3^{rd}$ Generation Partnership Project; Technical Specification Group Radio Access Network; Evolved Universal Terrestrial Radio Access (E-UTRA); Physical layer procedures (TS 36.213 Release 8, or later)," which is incorporated by reference herein.

Figure 1:
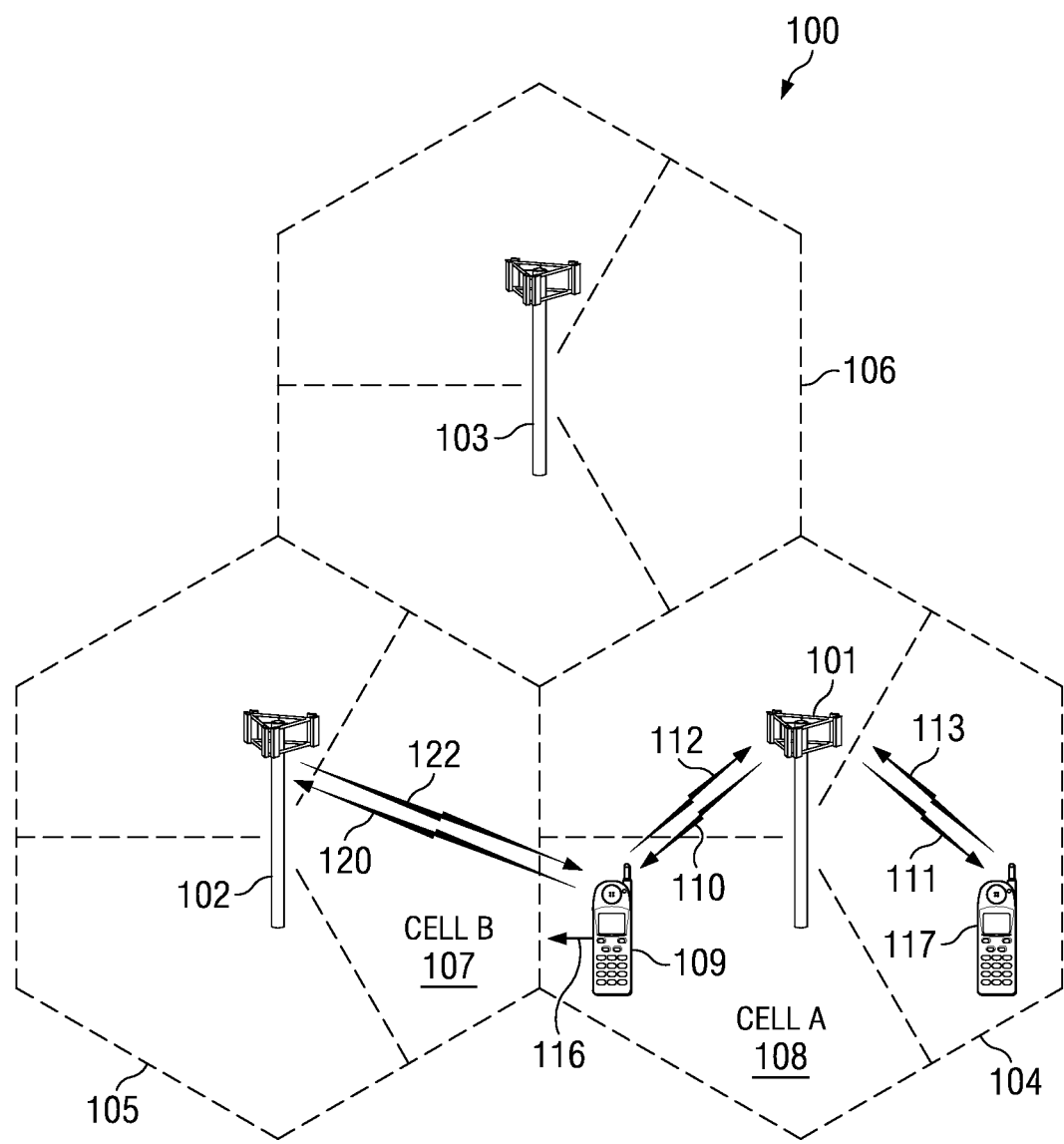
FIG. 1 is a pictorial of an illustrative telecommunications network in which an embodiment of the invention is used to support single user and multiuser MIMO transmission signals.

FIG. 1 is a pictorial of an illustrative telecommunications network 100 in which an embodiment of the invention is used to support single user and multiuser MIMO transmission signals, as described in more detail below. The illustrative telecommunications network includes eNBs 101, 102, and 103, though in operation, a telecommunications network may include many more eNBs or fewer eNBs. Each of eNB 101, 102, and 103 is operable over corresponding coverage areas 104, 105, and 106. Each eNB's coverage area is further divided into cells. In the illustrated network, each eNB's coverage area is divided into three cells. Handset or other UE 109 is shown in Cell A 108, which is within coverage area 104 of eNB 101. Transmission occurring between eNB 101 and UE 109 via downlink channel 110 and uplink channel 112. As UE 109 moves 116 out of Cell A 108, and into Cell B 107, UE 109 may be "handed over" to eNB 102.

When UE 109 is not up-link synchronized with eNB 101, non-synchronized UE 109 employs non-synchronous random access (NSRA) to request allocation of up-link 112 time or frequency or code resources. If UE 109 has data ready for transmission, for example, traffic data, measurements report, tracking area update, etc., UE 109 can transmit a random access signal on up-link 112 to eNB 101. The random access signal notifies eNB 101 that UE 109 requires up-link resources to transmit the UE's data. ENB 101 responds by transmitting to UE 109, via down-link 110, a message containing the parameters of the resources allocated for UE 109 up-link transmission along with a possible timing error correction. After receiving the resource allocation and a possible timing adjustment message transmitted on down-link 110 by eNB 101, UE 109 may adjust its transmit timing, to bring the UE 109 into synchronization with eNB 101, and transmit the data on up-link 112 employing the allotted resources during the prescribed time interval. eNB 101 also sends a downlink grant to UE 109 when the eNB has data to transmit to UE 109. The downlink grant specifies one or more resource blocks on which the eNB will transmit to the UE on downlink 110.

Similarly, UE 117 may communicate with eNB 101 on downlink 111 and uplink 113. eNB 101 may decide send data on DL 110 in SU-MIMO mode to UE 109. Alternatively, eNB 101 may decide to send data on DL 110 to UE 109 and on DL 111 to UE 117 in MU-MIMO mode, as will be described in more detail below.

Coordinated Multiple Point (CoMP) transmission has been proposed as a promising technology to meet the spectral efficiency requirement in Rel-10. As opposed to conventional cellular network where a single UE receives data transmission from a single eNB at a time, multiple eNBs may coordinately design the downlink transmission to a UE simultaneously on the same frequency resources. In order to reduce the DRS overhead and assist PDSCH demodulation, DRS from different CoMP transmission points should be configured in the same time/frequency resources. In other words, the same frequency domain offset of DRS should be used at different CoMP transmission points.

The basic idea of CoMP is to extend the conventional "single cell-multiple UEs" system structure to a "multiple cells-multiple UEs" network topology so that the concept of cell edge UE would give way to that of a UE in the vicinity of cell boundaries being at the center area of a "super-cell" consisting multiple cells. Hence, UEs in CoMP communication mode will get much better service and boosted SNR if several nearby cells work in cooperation, where the involved cells are called CoMP cooperating cells.

For CoMP operation, when UE 109 is close to a cell boundary, eNB 101 also coordinates with eNB 102 via a backhaul interconnecting network to determine which resource to allocate to UE 109 so that both eNBs can cooperate to transmit in CoMP manner. Once the UE is synchronized, the eNB may both simultaneously send data and reference symbols (RS) on DL in MIMO mode to UE 109, using DL 110 and 120, and receive data and feedback on UL 112 and 122, for example.

The current E-UTRA (LTE Rel 8) specification supports up to 1-layer beamforming on antenna port 5. The eNB applies beamforming on it's transmit antenna array. The beamforming vector is selected by the eNB and is transparent to the UE, i.e., eNB does not explicitly signal the beamforming vector to UE via DL control signal. To enable channel estimation and data demodulation, dedicated reference signals need to be transmitted. A dedicated demodulation reference symbol (DRS) is to be precoded by the same precoding vector applied to PDSCH data which enables UE to estimate the effective downlink channel for demodulation. The same beamforming vector is applied to both DRS and 1-layer PDSCH.

Enhanced CQI/PMI Feedback for CoMP

Three types of feedback categories have been agreed to by the 3GPP working group for coordinated multi-point (CoMP) transmission:

1) Explicit channel state/statistical information feedback, in which the feedback represents the channel as observed by the receiver, without assuming any transmission or receiver processing;

2) Implicit channel state/statistical information feedback, in which feedback mechanisms that use hypotheses of different transmission and/or reception processing, e.g., CQI/PMI/RI;

3) UE transmission of SRS can be used for CSI estimation at eNB exploiting channel reciprocity.

Both explicit and implicit feedback are more tailored to short-term channel variation to enable short-term beamforming and interference avoidance in CoMP transmission. For CoMP cooperation based on long-term ("fixed") channel characteristics (e.g. angle of arrival (AoA), angle of departure (AoD)), sounding reference symbol (SRS) based channel state information (CSI) estimation exploiting channel reciprocity could be used without incurring additional feedback formats and overhead.

Explicit Feedback

For each cell in the UE's measurement set that is reported in a given subframe, one or several channel properties may be reported. Channel properties include (but are not limited to) the following (T is the cell index):

1) Channel matrix (Hi)—short term (instantaneous)
   The full matrix Hi, or
   main eigen component(s) of Hi The prefix "eigen" is the German word for "innate, distinct, self." Eigen values, eigen vectors and eigen spaces are properties of a matrix. For example, if the action of a matrix on a (nonzero) vector changes its magnitude but not its direction, then the vector is called an eigen vector of that matrix.

2) Transmit channel covariance (RI), where $Ri = (sum\{Hij^\dagger Hij\})/J$, $j=0, 1, 2, \ldots, J-1$, ('j' is span over time or frequency)

The full matrix Ri, or main elgen component(s) of Ri

3) Inter-cell channel properties may also be reported.

The feedback may also include a noise- and interference part. For example, Interference outside the cells reported by the UE or CoMP transmission points may be reported. Total receive power (Io) or total received signal covariance matrix may be reported. A covariance matrix of the noise-and-interference may include the full matrix, or just the main elgen component(s).

Implicit Feedback Hypotheses

The UE may form hypotheses based on higher layer signaling and the feedback may be based on one or a combination of various hypothesis. The following list is an example, but is not intended to be exclusive.

1) Single vs. Multi user MIMO.
2) Single cell vs. Coordinated transmission. Within coordinated transmission, there may be single point coordinated scheduling and coordinated beamforming (CS/CB) vs. multi-point or joint processing (JP) transmission. Within joint processing CoMP, there may be subsets of transmission points or subsets of reported cells (Joint Transmission). There may also be CoMP transmission point(s) with dynamic cell selection.
3) Transmit precoder (i.e. transmission (tx) weights). In JP transmission, multiple single-cell or multi-cell PMI may be used to capture coherent or non-coherent channels across reported cells. In CB/CS transmission, single-cell or multiple single-cell PMIs may be used to capture channels from the reported cell(s) to the UE. A Transmit precoder may be based on or derived from the PMI weight. Other types of feedback, such as main multi-cell eigen-component, instead of PMI may also be performed.
4) Receive processing (i.e. receiver (rx) weights).
5) Interference based on particular tx/rx processing.

There may be a need for the UE to convey to the network the hypothesis or hypotheses used, if the hypothesis was not conveyed to the UE by higher layer signaling. In this case, there may be explicit signaling of hypothesis to eNB. Alternatively, there may be a semi-static hypothesis configuration, such as grouping of hypotheses with explicit signaling of hypothesis by the eNB to the UE. Additionally or alternatively, a precoded RS may be used to allow UE to generate refined CQI/RI feedback.

For implicit feedback, a structured codebook may be used, where the rank-R codebook at the eNB is denoted as defined in equation (1).

$$E_R(W_{1,R}, W_{2,R}, \ldots W_{M,R}) \quad (1)$$

where $W_{m,R}$, $m=1, 2, \ldots M$ is the $N_t \times R$ precoding matrix, M is the size of the rank-R codebook.

Implicit Feedback

Implicit feedback is in the form of recommended RI/PMI/CQI based on a UE's measurement. The UE measurement includes both a channel matrix H and interference and noise information. Rather than having this information explicitly reported, such information is embedded implicitly in the recommended RI/PMI feedback where a recommended precoding configuration is derived to optimize the downlink (DL) throughput. Whether RI/PMI is derived on the short-term instantaneous channel (H and R) or the long term average channel ($H=(sum\{Hj^\dagger Hj\})/J$, $j=0, 1, 2, \ldots, J-1$) is part of the UE hypothesis and may be signaled to eNB. Alternatively, it is also possible for an eNB to control this configuration by radio resource control (RRC) signaling.

Implicit feedback is a reflection of processed channel information. A number of UE implementation specific parameters which are generally unknown to the eNB, e.g. receiver processing such as minimum mea-square error (MMSE) and/or successive interference cancellation (SIC) are usually embedded in the implicit report, which otherwise would require additional signaling. This may assist eNB to perform link adaptation accordingly and possibly reap the gain of a more advanced MIMO receiver. Such advantage is not captured in the explicit channel feedback.

CQI-based feedback currently in Rel-8 of the 3GPP standard allows more tractable testing for each UE report. This is a desirable property that is also provided by embodiments of the improved feedback designs described herein for CoMP and MU-MIMO.

For implicit feedback, the overhead remains largely independent with the number of transmit and receive antennas because it is not necessary to report the individual channel component (H and R) for each transmit/receive antenna pair. In general, a constant feedback overhead unrelated to the UE-specific RX antenna parameter is desirable.

For CoMP, implicit feedback schemes may be for joint processing or for coordinated beam forming. For joint processing, a UE reports a recommended RI/PMI for the reporting set assuming coherent or non-coherent combining. Both joint feedback (e.g. coherent combining) and disjoint feedback (non-coherent combining) are possible. For a joint report, a UE report as single RI/PMI for the CoMP cooperating set. For a disjoint report, the UE report multiple RI/PM to the cells in the CoMP cooperating set.

For coordinated beamforming, a UE reports the recommended RI/PMI for the serving cell, as well as a set of PMIs for the non-serving cells in the reporting set. The PMIs for the non-serving cells are optimized along with the serving-cell PMI to reduce the co-channel interference and improve the cell coverage/throughput.

Implicit Feedback for CoMP

Assuming three cells are in a cooperating set, the received signal at the UE for joint processing is given in equation (2) and the received signal for coordinated beamforming/scheduling is given in equation (3), where $H_i$ and $W_i$ denotes the channel and precoding matrix associated with the i-th transmitting point.

$$y_1 = H_1 W_1 s_1 + H_2 W_2 s_1 + H_3 W_3 s_1 + n_1 \quad (2)$$

$$y_1 = H_1 W_1 s_1 + H_2 W_2 s_2 + H_3 W_3 s_3 n_1 \quad (3)$$

With disjoint feedback, the UE may report a recommended RI/PMI for each eNB in the measuring set respectively, hence the feedback overhead increases linearly with the size of the measurement set. We define one set of recommended RI/PMI as $\{W_1, W_2, W_3\}$, where $W_i$ is the PMI feedback for the i-th coordinating eNB.

In the Rel-8 feedback paradigm, only one set of recommended RI/CQI/PMI $\{W_1, W_2, W_3\}$ is reported by the UE at each feedback instance. The network may follow the recommended RI/CQI/PMI when the UE feedback is expected to be accurate, but also has the freedom to override the UE feedback.

In order to improve the link adaptation and scheduling flexibility, one enhancement is to feedback multiple sets of RI/PMI as opposed to feedback of just the "optimal" set only. For example, the $1^{st}$ optimal set of RI/PMI configuration for the entire CoMP measurement set, the $2^{nd}$ optimal set of RI/PMI configuration for the entire CoMP measurement et, so on and so forth. The associated CQIs need to be fed back as well. The eNB will thus have greater flexibility of deciding on the actual downlink precoding format and to perform scheduling based on the multiple available precoding choices.

Naturally the improved scheduling and precoding flexibility comes with a cost of higher feedback overhead compared to Rel-8 implicit feedback. However note that Rel-8 feedback is designed with a very low feedback overhead in mind, thus a moderate increase in the overhead is understandably acceptable.

In an extreme case, a UE may report all the possible PMI combinations $M^K$, where M is the codebook size and K is the number of eNBs in the measurement set, which would provide the finest channel knowledge. In practice, this is likely an overkill and it is expected that reporting a few possible PMI configuration sets (e.g. $N<<M^K$) would exploit most of the CoMP cooperating gains. Most other PMI combinations would likely result in sub-optimal spatial combining and therefore does not warrant additional feedback bandwidth.

To give an example, assume mode 3-1 PUSCH report with wideband PMI and frequency-selective CQI with sub-band size of five resource blocks (5 RB) in 10 MHz bandwidth (50 RB). The feedback overhead with the best N sets of RI/CQI/PMI report is given in Table 1.

TABLE 1

Exemplary feedback overhead with best N sets RI/CQI/PMI

|  | RI | PMI | CQI |  |
| --- | --- | --- | --- | --- |
|  | Max 3-bits | 4N bits | 48N bits | 52N + 3 |
| N = 1 | Max 3-bits | 4 bits | 48 bits | 55 bits |
| N = 2 | Max 3-bits | 8 bits | 96 bits | 107 bits |
| ... |  |  |  |  |
| N = 16 | Max 3-bits | 4N bits | 48N bits | 835 bits |

In this example, for RI, a single rank is reported to all eNBs in the reporting set. Alternatively different RIs may be feedback to different eNBs in the measurement set; however, this would incur marginal overhead increase. For PMI, if only the optimal set PMI is reported (as in Rel-8), then N=1 PMI is reported to each eNB in the measurement set. This amounts to a feedback overhead of 4 bits per eNB (assuming size-16 codebook in each rank). As an alternative, the best N sets of PMIs may be reported to allow more flexible precoding and scheduling decision. This leads to a PMI overhead of 4N per eNB per report instance. For CQI, similarly, reporting the best N sets of recommended CQIs yields an overhead of (4+2*10)*2*N=48N, assuming two CQI reports per subband to allow spatial multiplexing.

For instance, the feedback overhead when reporting N=16 sets of recommended PMIs amounts to 835 bits. Given that the feedback periodicity should in general be an integer multiple of the low-density CSI cycle (e.g. 10 ms to maintain low overhead for Rel-10 CSI-RS), the average feedback rate amounts to 83.5 kbps per UE if one implicit report is performed every 10 ms. Furthermore, the UE may adaptively configure the set of PMI report (N) to reach an appropriate tradeoff between feedback overhead and performance.

Implicit Feedback for MU-MIMO

In this section various embodiments of implicit feedback for single-cell multiuser MIMO (MU-MIMO) transmission are disclosed. A single eNB transmits to two or more UEs simultaneously over the same frequency resources in downlink. However the disclosed algorithm may be extended to the CoMP MU-MIMO context in a straightforward manner.

Assume that two UEs are configured in the MU-MIMO mode. The received signal at user 1 is given by equation (4).

$$y_1 = H_1 W_1 s_1 + H_1 W_2 s_2 + n_1 \qquad (4)$$

where the first term on the right side denotes the desired signal, and the second term denotes the inter-user interference. $S_1$ is the PDSCH data transmitted to UE1, $S_2$ is the PDSCH data transmitted to UE2, and $n_1$ is the noise and interference observed by UE1. H1 is the downlink channel from the eNB to UE1. $W_1$ is the precoding matrix for UE1, and $W_2$ is the precoding matrix for UE2. From UE1's perspective, PDSCH transmission to UE2 ($W_2 S_2$) appears as interference.

To detect $s_i$ at UE 1, a symbol-wise slicing is applied as given by (5).

$$\hat{s}_1 = L(v_1' y) \qquad (5)$$

where $v_1$ is the UE beamforming vector.

For example, the linear minimum mean-squared error (LMMSE) receiver may be expressed as $$v_1 = \operatorname{argmin} \frac{v_1'(H_1 w_1 w_1' H_1') v_1}{v_1'(H_1 w_2 w_2' H_1' + N_o I) v_1} \qquad (6)$$

The interfering precoding vector $w_2$ is generally assumed not known at UE 1.

Enhanced CQI/PMI Feedback for MU-MIMO

In conventional implicit CSI feedback, UE only reports a single set of RI/PMI/CQI for its own use (i.e., $W_1$ as in Eqn [5]). A simple method to extend the Rel-8 feedback structure is to allow multiple sets of recommended RI/PMI to be reported, for itself as well as for a hypothetical user to be co-scheduled in the MU-MIMO mode. To be more specific, in one set of a PMI report, a UE may report a recommended precoder $PMI_1$ ($W_1$), a recommended interfering precoder $PMI_2$ ($W_2$) for the co-scheduler UE, along with the CQI assuming ($PMI_1$, $PMI_2$) is used in the DL. Thus, one set of an implicit report is defined as: O=($PMI_1$, $PMI_2$, CQI). Upon receiving the UE feedback, eNB understands that $PMI_1$ is the recommended preceding matrix for the target UE, while $PMI_2$ is the recommended preceding matrix for a potentially co-scheduled UE. Subsequently, eNB may compare the PMI feedback ($PMI_1$, $PMI_2$) from different users in order to find out if two UEs can be paired up in MU-MIMO transmission. If the PMI report from two users match each other (e.g., $PMI_1$ of UE1 matches $PMI_2$ of UE2, and $PMI_2$ of UE1 matches $PMI_1$ of UE2), eNB may pair these two UEs together in MU-MIMO transmission mode.

Similar to the CoMP scenario, multiple sets of PMI combinations (desired and interfering) allows an eNB to have more refined knowledge to do link adaptation of the channel quality when different precoding matrix combinations are used in the downlink, and allows better UE pairing. Hence, it is possible to report multiple sets of such PMI combinations, e.g.

$O_1=(PMI_{11}, PMI_{21}, CQI_1)$
$O_2=(PMI_{12}, PMI_{22}, CQI_2)$
...
$O_N=(PMI_{1N}, PMI_{2N}, CQI_N)$.

Brute-Force Feedback

Let K denote the total number of UEs that are simultaneously supported (M≥K), then the total number of possible precoding matrix combinations (N) are given by (7).

$$P_K^M = \frac{M!}{(M-K)!}, \quad (7)$$

For each of these possible precoding matrix combinations, there exists a unique CQI for the target UE and it can be accurately calculated. This brute-force method will exhaustively feed back these CQIs to the serving Node B to perform user scheduling and link adaptation. A detailed procedure is given as follows, where UE 1 is chosen as the desired UE without loss of generality.

Let (n,m) denote a precoding matrix combination where n is the PMI of UE 1, and m is the PMI of UE 2. n and in are chosen from [1, M] where M is the codebook size.

For each possible precoding matrix combination (n,m), UE 1 derives its corresponding CQI. The total number of precoding matrix combinations and CQI is given by M(M−1), when K=2. These M(M−1) CQIs are fed back to the serving Node B, along with the indices of their PMI combinations.

Obviously, this brute-force feedback achieves the performance upper bound with implicit feedback.

Best-N Set Feedback

Alternatively, another embodiment may report the best N sets of CQI/PMI. A few examples of the criterion for selecting the best N sets are described below.

Example 1

The best N sets of PMI combinations which result in the best CQIs for the desired UE are reported.

Example 2

For each possible precoding matrix n of UE 1 ($W_1$), [N/M] precoding matrices candidates ($W_2$) are assumed for the co-scheduled UE and the corresponding CQIs are reported to the UE. The criterion for choosing the [N/M] precoding matrices ($W_2$) for the co-scheduled UE may be such that it maximizes the CQI of the desired UE, or to maximize a certain distance matrix (e.g. Chordal distance or Fubini-norm distance) to the precoding matrix of the desired UE ($W_2$).

Example 3

For each possible precoding matrix for user 1 ($W_1$), [N/M] precoding matrices are assumed for the co-scheduled UE and the corresponding CQIs are reported to the UE. The criterion for choosing the [N/M] precoding matrices ($W_2$) may be the precoding matrices whose correlation to the precoding matrix of the desired UE ($W_1$) is minimized. Alternatively, for example, two UEs are allowed to be transmitted at the same time if their precoding vectors satisfies $|w_1'w_2|<\rho$ where $\rho$ is a pre-defined threshold on the correlation.

Example 4

Assume wideband preceding, frequency-selective CQI with subband size 5 RB and 10 MHz system bandwidth (50 RB). As the number of layers for each UE in MU-MIMO mode has not bee decided, rank-1 transmission (e.g. a single MCS report) is assumed as aligned with MU-MIMO in Rel-8 and Rel-9. Assuming size-16 codebook and a maximum of two UEs in MU-MIMO, the feedback overhead when the best N sets of PMI combinations are reported, is given as $2*4N+(4+2*10)*N=32N$.

For example, if the best N=16 sets of PMI combinations are reported, the feedback overhead is 512 bits per feedback instance. If the feedback periodicity is equivalent to the channel state information reference symbol (CSI-RS) cycle (e.g. 10 ms), this amounts to a feedback rate of 51 kbps. Alternatively, the feedback overhead may be reduced by configuring four or eight sets, for example, of CQI/PMI report N by RRC signaling.

Figure 2:
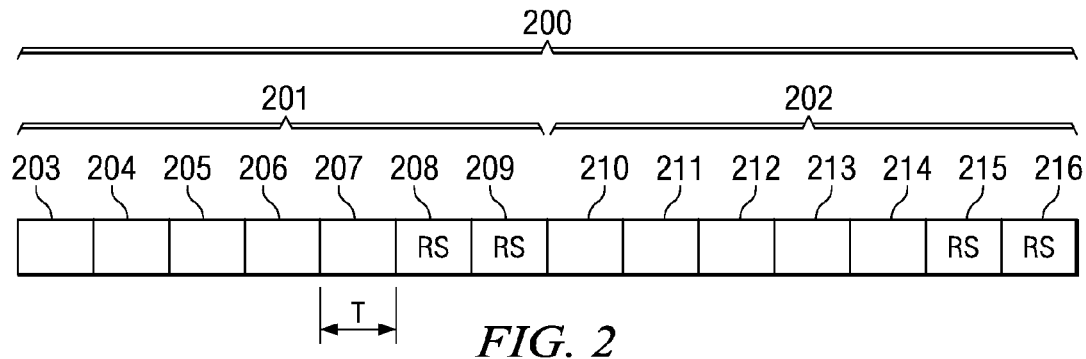
FIG. 2 is an illustrative format of one subcarrier (tone) of a DL transmission subframe for use in the network of FIG. 1.

FIG. 2 is an illustrative format of one subcarrier (tone) of a DL transmission subframe for use in the network of FIG. 1. It comprises of 14 resource elements. Elements of the present invention will be described in the context of EUTRA sub-frame, even though its applicability is broader. Orthogonal frequency division multiple access (OFDMA) based systems include classic OFDMA as well as its alternatives, like single carrier frequency division multiple access (SC-FDMA) and discrete Fourier transform (DFT)-spread OFDMA. In OFDMA based systems, frequency resources are divided into tones. Tones are further grouped into "tone blocks" or "resource blocks" for purposes of frequency-dependent scheduling of mobiles, and other possible purposes. Thus, each mobile can be allocated one or more resource blocks in an OFDMA based system. This group of resource blocks will be denoted as the frequency allocation for a given mobile.

FIG. 2 illustrates just one subcarrier of sub-frame 200 comprising two slots 201 and 202. It comprises of 14 resource elements. This resource element is configured for use on antenna port 7 or 8, as will be described in more detail below. Duration of the EUTRA sub-frame is 1 ms, which means that duration of two slots 201 and 202 is 0.5 ms each. Each slot comprises seven symbols when a normal cyclic protection field (CP) is appended to each symbol, or six symbols when an extend CP is appended to each symbol. For example, slot 201 comprises symbols 203-209. The slot 202 comprises symbols 210-216. Symbols 208, 209, 215 and 216 are Demodulation (DM) Reference symbols (RS), and are used to derive channel estimates which are needed for coherent demodulation of the remaining symbols that are modulated with payload data. LTE Rel 9 also defines several other antenna port configurations for antenna ports 0-3 and 5, where port 0-3 are unprecoded cell-specific reference symbols (CRS) antenna ports and port 5 is DMRS for single-layer data transmission defined in Rel-8. Each symbol has a time duration equal to approximately T, which is a function of the slot time. In this embodiment, the slot time is 500 μsec. Since the first symbol in the slot has more cyclic prefix samples, not all symbols are exactly equal in duration, as per 3GPP 1836.211. Nevertheless, all symbols can be considered to be approximately equal in duration, which doesn't exceed 75 μsec. Note that if all symbols were exactly equal in duration, the symbol time T would approximately be equal to 500 μsec/7=71.4 μsec.

In some embodiments of the invention, the set of reference signal sequences comprises CAZAC sequences and near-CAZAC sequences. Near-CAZAC is a term which designates sequences which are obtained using computer search methods, and whose properties approximate CAZAC properties. In some embodiments of the invention, CAZAC sequences are Zadoff-Chu sequences. In some embodiments of the invention, near-CAZAC sequences are sequences of the form $\exp(j*\pi*(\phi(n)/4)$; wherein the length of $\phi(n)$ is an integral multiple of 12. Here, "j" is the imaginary unit.

In some embodiments of the invention, the set of reference signal sequences comprises CAZAC sequences only. In some embodiments of the invention, the set of reference signal sequences comprises near-CAZAC sequences only. In some embodiments of the invention, the set of reference signal sequences comprises both CAZAC sequences and near-CAZAC sequences. Sometimes, a phase ramp is applied to modify the first sequence, for example $\exp(j*n*\alpha+j*\pi*\phi(n)/4)$ can still be considered as a reference signal sequence. For 3GPP EUTRA, there are 30 possible sequences of length 24, which are also near-CAZAC. For length 36 and more, sequences are produced from CAZAC sequences. Thus, the set of reference signal sequences comprises both CAZAC and near-CAZAC sequences.

Further details on the construction of reference signals, demodulation reference signals and sounding reference signals are included in 3rd Generation Partnership Project; GPP TS 36.211 V9.1.0 (2010) "Technical Specification Group Radio Access Network; Evolved Universal Terrestrial Radio Access (E-UTRA); Physical Channels and Modulation," in particular in section 6 and which is incorporated herein by reference.

There are currently two definitions of "transparency". A first type of transparency is defined in terms of SU/MU-MIMO mode. Non-transparency means that a UE is semi-statically configured in either the SU or MU-MIMO mode which is signaled to the UE via higher layer signaling. UE is semi-statically configured to operate in SU-MIMO transmission mode or MU-MIMO transmission mode, hence different DL (downlink) control and UE feedback are used. Higher layer (L3) radio resource control (RRC) signaling configures the SU/MU-MIMO mode for the UE. Transparency means that the UE is configured in one joint SU/MU MIMO transmission mode, thus the same UE feedback and DL control.

A second type of transparency is defined in terms of knowledge of the co-scheduled UE. Non-transparency means that the presence of a co-scheduled UE is known and possibly taken into account in the DL control signaling and UE feedback. On the other hand, non-transparency means that UE is agnostic about the presence of a co-scheduled UE, hence the same UE feedback and DL control is used.

Regardless of which definition is used, "transparency" essentially means that no signaling is provided to the UE regarding transmission to the other UEs in the same time/frequency resources. If the presence of a co-scheduled UE is provided to the target UE, MU-MIMO transmission is "non-transparent". For example, in LTE Rel-8, MU-MIMO is a semi-statically configured transmission mode, hence a UE will know that it will be paired up with another UE if it is configured in such a transmission mode. Another possibility is to signal to the UE dynamically whether or not transmission to another UE is present, that is, a dynamic downlink grant has been provided on the PDCCH. In this case, a UE can be either configured in the semi-static SU or MU-mode.

Figure 3:
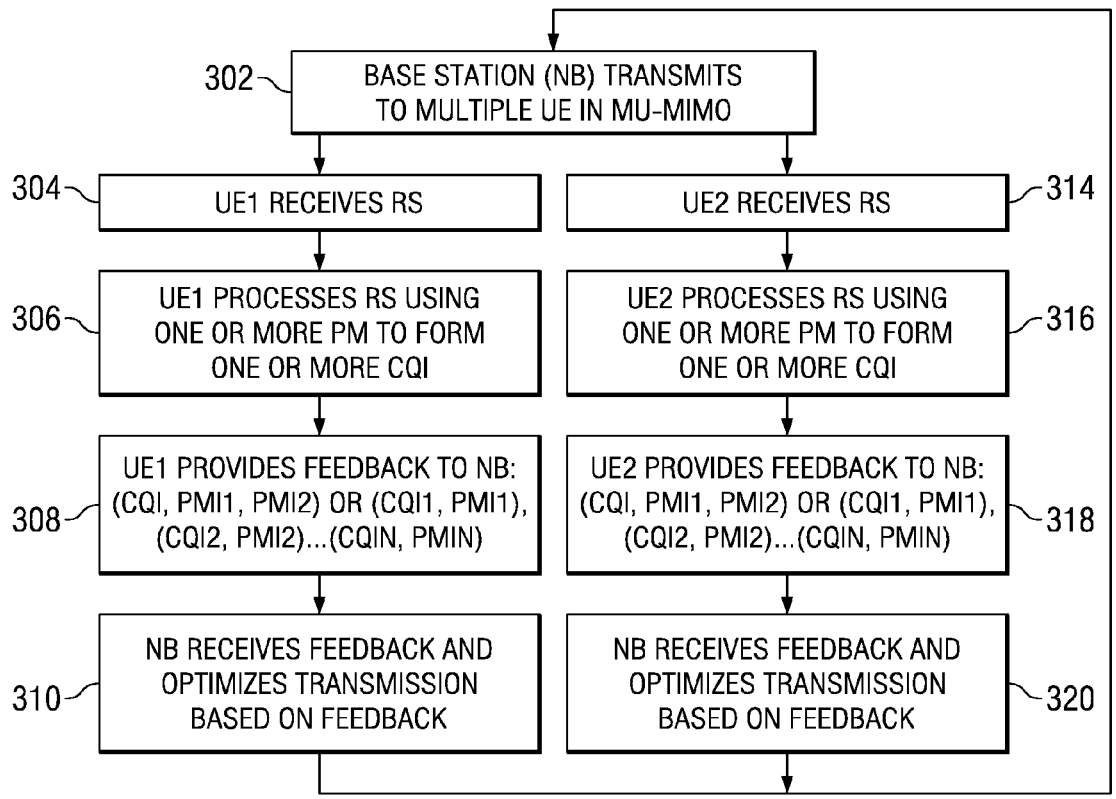
FIG. 3 is a flow diagram illustrating enhanced CQI feedback in MU-MIMO operation in the network of FIG. 1.

FIG. 3 is a flow diagram illustrating enhanced CQI feedback in MU-MIMO operations. An eNB in a given cell is transmitting 302 to multiple UE in MU-MIMO mode on different beams. As described earlier, the downlink transmission includes reference symbols (RS) that may be used by the UE to determine channel quality. A first UE, (UE1) receives 304 a reference symbol from the base station (eNB). Simultaneously, a second UE (UE2) receives 314 the same signal on a different beam.

Each UE processes 306, 316 the reference symbol with one or more of a plurality of precoding matrices to form a plurality of channel quality indices (CQI) as described in more detail above.

Each UE provides feedback 308, 318 to the eNB comprising one or more feedback CQI selected from the plurality of CQI and one or more precoding matrix indicators (PMI) identifying the one or more preceding matrices used to form each of the one or more feedback CQIs, wherein at least two PMI are included in the feedback. For example, the plurality of CQI is representative of all preceding matrices assigned to the UE, and the entire plurality of CQI and respective precoding matrix indicators are provided as feedback.

In another embodiment, each of the plurality of CQI is formed using a different combination of two or more of the plurality of preceding matrices. The feedback comprises two or more PMI identifying the combination of precoding matrices used to form each of the one or more feedback CQI. In particular, each combination of precoding matrices may include at least a first preceding matrix recommended for UE1, and a second preceding matrix recommended for a hypothetical UE2 to be co-scheduled with the UE. Since UE1 is not aware of UE2 and visa versa, each UE processes the RS and assumes there is a hypothetical UE that is operating with it in MIMO mode.

As described earlier, processing 306, 316 may calculate a correlation between each combination of preceding matrices and select for feedback only combinations having a lower correlation. In some embodiments, only combinations having a correlation below a selected threshold are selected for feedback.

Alternatively, as described earlier, processing 306, 316 may calculate a distance between each combination of preceding matrices and select for feedback only combinations having a larger distance.

Figure 4:
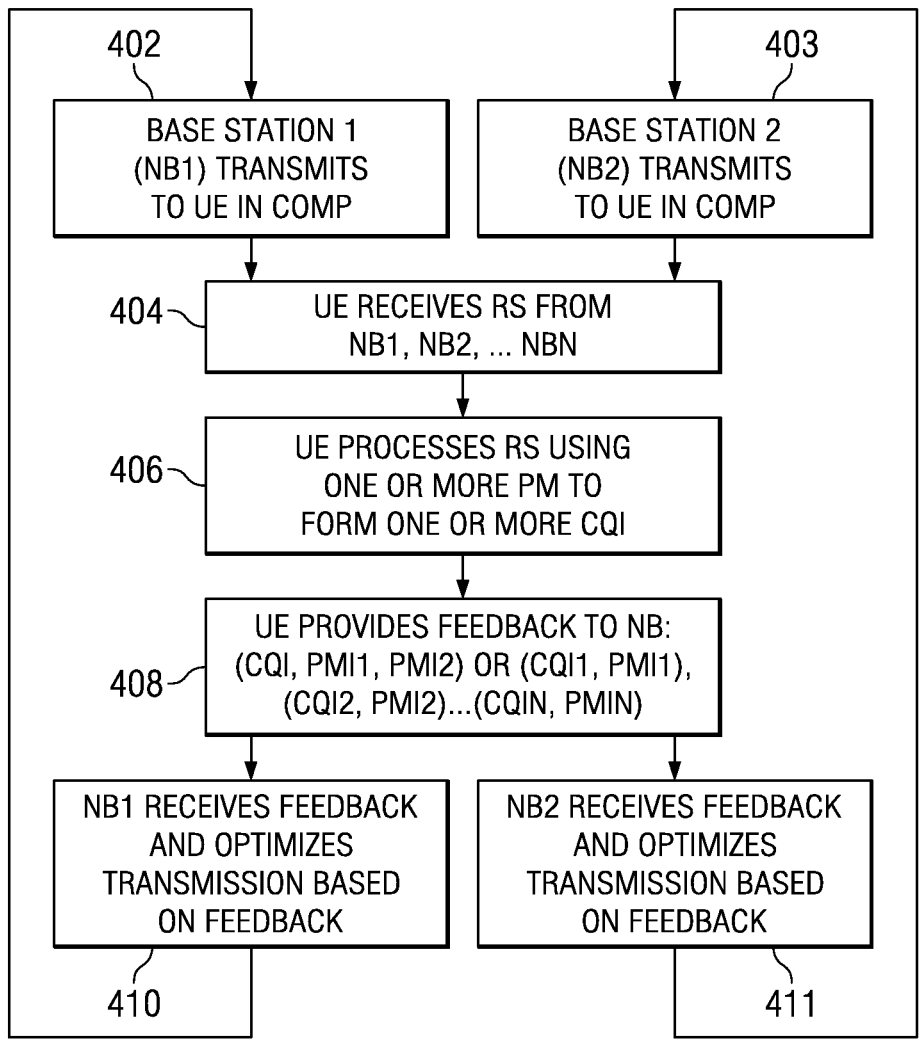
FIG. 4 is a flow diagram illustrating enhanced CQI feedback in CoMP operation in the network of FIG. 1.

FIG. 4 is a flow diagram illustrating enhanced CQI feedback in CoMP operation. In this mode, two or more eNB are transmitting 402, 403 to a UE in CoMP mode on the same RB. As described earlier, the downlink transmission includes reference symbols (RS) that may be used by the UE to determine channel quality. Depending on the CoMP configuration, all of the cooperating eNB may be transmitting to the UE using exactly the same resources, or the cooperating eNB may be transmitting to the same UE using different resources, such as different resource symbols.

In the illustrated embodiment, the UE receives 404 a first reference symbol (RS1) from eNB1 and also a different RS2 from cooperating eNB2.

The UE processes each of the received reference symbols with one or more of a plurality of precoding matrices to form a set of channel quality indices (CQI) for RS1 and another set of CQI for RS2.

The UE provides feedback 408 to the eNB that includes one or more feedback CQI and PMI selected for the first RS and one or more feedback CQI and PMI selected for the second RS.

eNB1 receives 410 the feedback and dynamically optimizes transmission based on the one or more feedback CQI selected for RS1 and eNB2 simultaneously receives 411 the feedback and dynamically optimizes transmission based on the one or more feedback CQI selected for RS2. If there are more than two eNB cooperating, a similar process is performed by each eNB.

System Example

Figure 5:
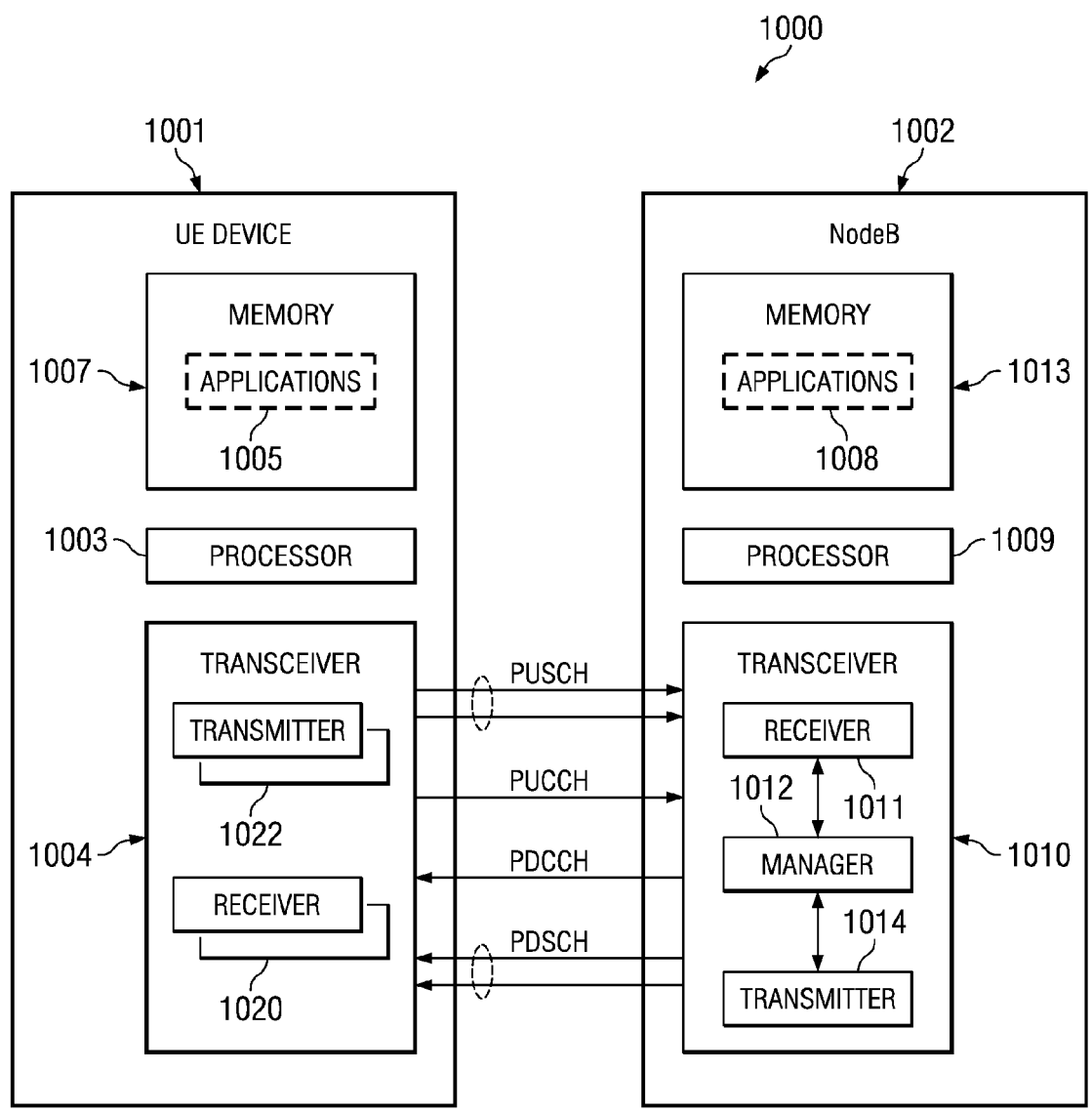
FIG. 5 is a block diagram illustrating an exemplary portion of a cellular network with a base station in communication with a mobile device.

FIG. 5 is a block diagram illustrating an exemplary portion of the cellular network of FIG. 1. As shown in FIG. 5, the wireless networking system 1000 includes a UE device 1001 in communication with an eNB 1002. The UE device 1001 may represent any of a variety of devices such as a server, a desktop computer, a laptop computer, a cellular phone, a Personal Digital Assistant (PDA), a smart phone or other electronic devices. In some embodiments, the electronic UE device 1001 communicates with the eNB 1002 based on a LTE or E-UTRA protocol. Alternatively, another communication protocol now known or later developed can be used.

As shown, the UE device 1001 includes a processor 1003 coupled to a memory 1007 and a Transceiver 1004. The memory 1007 stores (software) applications 1005 for execution by the processor 1003. The applications 1005 could be any known or future application useful for individuals or organizations. As an example, such applications 1005 could be categorized as operating systems (OS), device drivers, databases, multimedia tools, presentation tools, Internet browsers, e-mailers, Voice-Over-Internet Protocol (VOIP) tools, file browsers, firewalls, instant messaging, finance tools, games, word processors or other categories. Regardless of the exact nature of the applications 1005, at least some of the applications 1005 may direct eNB (base-station) 1002 to transmit DL signals to UE device 1001 periodically or continuously via the transceiver 1004.

Transceiver 1004 includes uplink logic which may be implemented by execution of instructions that control the operation of the transceiver. Some of these instructions may be stored in memory 1007 and executed when needed. As would be understood by one of skill in the art, the components of the uplink and downlink logic may involve the physical (PHY) layer and/or the Media Access Control (MAC) layer of the transceiver 1004. Transceiver 1004 includes two or more receivers 1020 and two or more transmitters 1022 for SU/MU-MIMO, as described in more detail above.

eNB 1002 includes a Processor 1009 coupled to a memory 1013 and a transceiver 1010. Memory 1013 stores applications 1008 for execution by the processor 1009. The applications 1008 could be any known or future application useful for managing wireless communications. At least some of the applications 1008 may direct the base-station to manage transmissions to or from the user device 1001.

Transceiver 1010 includes a resource manager which enables eNB 1002 to selectively allocate uplink PUSCH resources and downlink PDSCH resources to the user device 1001. As would be understood by one of skill in the art, the components of the resource manager 1012 may involve the physical (PHY) layer and/or the Media Access Control (MAC) layer of the transceiver 1010. Transceiver 1010 includes a Receiver 1011 for receiving transmissions from various UE within range of the eNB and transmitter 1014 for transmission to the various UE within range. The resource manager executes instructions that control the operation of transceiver 1010. Some of these instructions may be located in memory 1013 and executed when needed. The resource manager controls the transmission resources allocated to each UE that is being served by eNB 1002 and broadcasts control information via the physical downlink control channel PDCCH.

During MIMO transmission from eNB 1002 via transmitters 1014 on PDSCH, eNB 1002 monitors channel conditions to adapt to the prevailing condition. This includes monitoring the channel quality indicator (CQI) and precoding matrix index (PMI) feedback provided by UE 1001 on the uplink channel using condition monitoring logic 1012 that is coupled to receiver 1011. As was described in more detail above, the enhanced CQI/PMI feedback includes at least two PMI in various embodiments of the invention.

During MIMO transmission to UE 1001 via transmitters 1014 on PDSCH, eNB 1002 forms DMRS signals using different amounts of cyclic shift, depending on the number of layers being used for transmission, as described in more detail above.

A typical eNB will have multiple sets of receivers and transmitters which operate generally as described herein to support hundreds or thousand of UE within a given cell. Each transmitter may be embodied generally by a processor 1009 that executes instructions from memory 1013 to perform the scrambling, mapping, and OFDM signal formation, using signal processing techniques as are generally known in the art along with embodiments of the invention described herein.

Other Embodiments

While the invention has been described with reference to illustrative embodiments, this description is not intended to be construed in a limiting sense. Various other embodiments of the invention will be apparent to persons skilled in the art upon reference to this description. For example, a larger or smaller number of symbols then described herein may be used in a slot.

While the invention has been described with reference to DL transmission, it may be equally applied to UL transmission.

Embodiments of the invention may support single user (SU) dual-layer beamforming using UE specific RS for both LTE-TDD (time division duplex) and FDD (frequency division duplex) using UE specific demodulation reference signals and mapping of physical data channel to resource elements that may provide forward compatibility with LTE-A Demodulation RS (DMRS). Embodiments of the invention extend single user dual-layer beamforming to multi-user dual-layer beamforming.

The term "frame" and "subframe" are not restricted to the structure of FIG. 2. Other configurations of frames and/or subframes may be embodied. In general, the term "frame" may refer to a set of one or more subframes. A transmission instance likewise refers to a frame, subframe, or other agreed upon quantity of transmission resource.

Embodiments of this invention apply to various types of frequency division multiplex based transmission. Thus, the concept can easily be applied to: OFDMA, OFDM, OFT-spread OFDM, OFT-spread OFDMA, SC-OFDM, SC-OFDMA, MC-CDMA, and all other FDM-based transmission strategies.

A NodeB is generally a fixed station and may also be called a base transceiver system (BTS), an access point, or some other terminology. A UE, also commonly referred to as terminal or mobile station, may be fixed or mobile and may be a wireless device, a cellular phone, a personal digital assistant (PDA), a wireless modem card, and so on.

As described in general above, an embodiment of the invention may perform all tasks described herein such as channel monitoring and precoding selection, formation of transmission signals, etc, using logic implemented by instructions executed on a processor. Another embodiment may have particular hardwired circuitry or other special purpose logic optimized for performing one or more to the tasks described herein.

An embodiment of the invention may include a system with a processor coupled to a computer readable medium in which a software program is stored that contains instructions that when executed by the processor perform the functions of modules and circuits described herein. The computer readable medium may be memory storage such as dynamic random access memory (DRAM), static RAM (SRAM), read only memory (ROM), Programmable ROM (PROM), erasable PROM (EPROM) or other similar types of memory. The computer readable media may also be in the form of magnetic, optical, semiconductor or other types of discs or other portable memory devices that can be used to distribute the software for downloading to a system for execution by a processor. The computer readable media may also be in the form of magnetic, optical, semiconductor or other types of disc unit coupled to a system that can store the software for downloading or for direct execution by a processor.

As used herein, the terms "applied," "coupled," "connected," and "connection" mean electrically connected, including where additional elements may be in the electrical connection path. "Associated" means a controlling relationship, such as a memory resource that is controlled by an associated port.

It is therefore contemplated that the appended claims will cover any such modifications of the embodiments as fall within the true scope and spirit of the invention.

The invention claimed is:

1. A method of operating a user equipment device in a cellular network, the method comprising:
    receiving a first reference symbol at the user equipment (UE) from a first base station (eNB);
    processing by the UE the first reference symbol with one or more of a plurality of precoding matrices to form a plurality of channel quality indices (CQI), wherein the plurality of CQI is representative of all precoding matrices assigned to the UE, and wherein the entire plurality of CQI and respective precoding matrix indicators are provided as feedback; and
    providing feedback from the UE to the eNB comprising one or more feedback CQI selected from the plurality of CQI and one or more precoding matrix indicators (PMI) identifying the one or more precoding matrices used to form each of the one or more feedback CQIs, wherein at least two PMI are included in the feedback, wherein each combination of precoding matrices comprise of at least a first precoding matrix recommended for the UE, and a second precoding matrix recommended for a hypothetical UE to be co-scheduled with the UE.

2. The method of claim 1, wherein the plurality of CQI is representative of all precoding matrices assigned to the UE, and wherein the entire plurality of CQI and respective precoding matrix indicators are provided as feedback.

3. The method of claim 2, wherein the received feedback comprises combinations of PMI selected by the UE that have a lower correlation between each combination of precoding matrices.

4. The method of claim 2, wherein the received feedback comprises combinations of PMI selected by the UE that have a larger distance between each combination of precoding matrices.

5. The method of claim 3, wherein only combinations having a correlation below a selected threshold are received as feedback.

6. The method of claim 1, further comprising receiving a second reference symbol from a second eNB coincidently with receiving the first reference symbol (RS);
    wherein the processing comprises forming one or more CQI for each of the first RS and the second RS using one or more of a portion of the plurality of precoding matrices; and
    wherein feedback comprise one or more feedback CQI and PMI selected for the first RS and one or more feedback CQI and PMI selected for the second RS.

7. The method of claim 1, wherein the UE is a mobile handset.

8. The method of claim 1, further comprising the first base station receiving feedback from a second UE comprising one or more feedback CQI selected by the second UE from a plurality of CQI formed by the second UE and one or more precoding matrix indicators (PMI) identifying the one or more precoding matrices used by the second UE to form each of the one or more feedback CQIs, wherein at least two PMI are included in the feedback, wherein each combination of precoding matrices comprise of at least a first precoding matrix recommended for the second UE, and a second precoding matrix recommended for a hypothetical UE to be co-scheduled with the UE; and
    wherein the eNB uses the feedback from the UB and the second UE to select precoding matrices for use by the eNB for co-scheduled transmission of data to the UE and to the second LIE in multi-user multi-input multi-output (MU-MIMO) mode.

9. A base station apparatus, comprising:
    circuitry for transmitting a reference symbol from the base station (eNB) for reception by a user equipment (UE);
    circuitry for receiving feedback from the UE comprising one or more feedback CQI selected by the UE from a plurality of CQI formed by the UE and one or more precoding matrix indicators (PMI) identifying the one or more precoding matrices used by the UE to form each of the one or more feedback CQIs, wherein at least two PMI are included in the feedback and, wherein each of the plurality of CQI is formed using a different combination of two or more of the plurality of precoding matrices, the feedback comprises two or more PMI identifying the combination of precoding matrices used to form each of the one or more feedback CQI, and each combination of precoding matrices comprise of at least a first precoding matrix recommended for the UE, and a second precoding matrix recommended for a hypothetical UE to be co-scheduled with the UE; and
    a processor coupled to the circuitry for transmitting and to the circuitry for receiving, the processor operable to use the at least two PMI in the feedback to select a precoding matrix for use by the eNB for transmission of data to the UE, and wherein the processor is operable to use the feedback from the UE to select precoding matrices for use by the eNB for co-scheduled transmission of data to the UE and to a second UE in multi-user multi-input multi-output (MU MIMO) mode.

10. The apparatus of claim 9, wherein the processor is operable to use the feedback comprising two or more PMI from the UE and from the second UE to select precoding matrices for use by the eNB for co-scheduled transmission of data to the UE and to the second UE in MU-MIMO mode.

11. A user equipment apparatus, comprising:
circuitry for receiving a first reference symbol from a first base station (eNB);
circuitry for processing the first reference symbol with one or more of a plurality of precoding matrices to form a plurality of channel quality indices (CQI), wherein each of the plurality of CQI is formed using a combination of two or more of the plurality of precoding matrices; and
circuitry for providing feedback to the eNB comprising one or more feedback CQI selected from the plurality of CQI and one or more precoding matrix indicators (PMI) identifying the one or more precoding matrices used to form each of the one or more feedback CQIs, wherein at least two PMI are included in the feedback, wherein the feedback comprises two or more PMI identifying the combination of precoding matrices used to form each of the one or more feedback CQI.

12. The apparatus of claim 11, wherein the plurality of CQI is representative of all precoding matrices assigned to the UE, and wherein the entire plurality of CQI and respective precoding matrix indicators are provided as feedback.

13. The apparatus of claim 11, wherein each combination of precoding matrices comprise of at least a first precoding matrix recommended for the UE, and a second precoding matrix recommended for a hypothetical U to be co-scheduled with the UE.

14. The apparatus of claim 11, further comprising circuitry for calculating a correlation between each combination of precoding matrices and selecting for feedback only combinations having a lower correlation.

15. The apparatus of claim 14, wherein only combinations having a correlation below a selected threshold are selected for feedback.

16. The apparatus of claim 11, further comprising circuitry for calculating a distance between each combination of precoding matrices and selecting for feedback only combinations having a larger distance.

17. The apparatus of claim 11, further comprising circuitry for receiving a second reference symbol from a second eNB coincidently with receiving the first reference symbol (RS);
wherein the processing comprises forming one or more CQI for each of the first RS and the second RS using one or more of a portion of the plurality of precoding matrices; and
wherein feedback comprise one or more feedback CQI and PMI selected for the first RS and one or more feedback CQI and PMI selected for the second RS.

18. The apparatus of claim 11, wherein the UE is a mobile handset.

19. A method of operating a user equipment device in a cellular network, the method comprising:
receiving a first reference symbol at the user equipment (UE) from a first base station (eNB);
processing by the UE the first reference symbol with one or more of a plurality of precoding matrices to form a plurality of channel quality indices (CQI), wherein each of the plurality of CQI is formed using a combination of two or more of the plurality of precoding matrices; and
providing feedback from the UE to the eNB comprising one or more feedback CQI selected from the plurality of CQI and one or more precoding matrix indicators (PMI) identifying the one or more precoding matrices used to form each of the one or more feedback CQIs, wherein at least two PMI are included in the feedback, wherein the feedback comprises two or more PMI identifying the combination of precoding matrices used to form each of the one or more feedback CQI.

20. The method of claim 19, wherein each combination of precoding matrices comprise of at least a first precoding matrix recommended for the UE, and a second precoding matrix recommended for a hypothetical UE to be co-scheduled with the UE.

21. The method of claim 20, wherein only combinations having a correlation below a selected threshold are selected for feedback.

22. The method of claim 19, further comprising calculating a correlation between each combination of precoding matrices and selecting for feedback only combinations having a lower correlation.

23. The method of claim 19, further comprising calculating a distance between each combination of precoding matrices and selecting for feedback only combinations having a larger distance.

24. A method for operating a base station device in a cellular network, the method comprising:
transmitting a reference symbol from the base station (eNB) for reception by a user equipment (UE);
receiving feedback from the UE comprising one or more feedback CQI selected by the UE from a plurality of CQI formed by the UE and one or more precoding matrix indicators (PMI) identifying the one or more preceding matrices used by the UE to form each of the one or more feedback CQIs, wherein at least two PMI are included in the feedback, wherein each of the plurality of CQI is formed using a combination of two or more of the plurality of precoding matrices; and
using the at least two PMI included in the feedback to select a precoding matrix for use by the eNB for transmission of data to the UE, wherein the feedback comprises two or more PMI identifying the combination of precoding matrices used to form each of the one or more feedback CQI.

25. The method of claim 24, wherein the plurality of CQI is representative of all precoding matrices assigned to the UE, and wherein the entire plurality of CQI and respective precoding matrix indicators are received as feedback.

* * * * *